United States Patent [19]

Schuchmann et al.

[11] Patent Number: 4,543,527
[45] Date of Patent: Sep. 24, 1985

[54] PROXIMITY SWITCH EXHIBITING IMPROVED START-UP CHARACTERISTICS

[75] Inventors: Russell P. Schuchmann, Milwaukee; Donald L. Van Zeeland, Greenfield, both of Wis.

[73] Assignee: Eaton Corporation, Cleveland, Ohio

[21] Appl. No.: 367,493

[22] Filed: Apr. 12, 1982

[51] Int. Cl.[4] .......................... G01B 7/14; G01V 3/10; H03B 5/00
[52] U.S. Cl. ................................. 324/207; 324/225; 324/327; 331/65; 331/117 R; 331/167
[58] Field of Search ............... 324/207, 208, 225, 234, 324/236, 327; 331/65, 117 R, 167

[56] References Cited

U.S. PATENT DOCUMENTS

| | | | |
|---|---|---|---|
| 2,811,643 | 10/1957 | Eberhard | 331/117 R |
| 3,381,533 | 5/1968 | Behrens | 331/117 R |
| 3,747,212 | 7/1973 | Buck | 331/65 |
| 4,001,718 | 1/1977 | Wilson et al. | 331/65 |
| 4,323,847 | 4/1982 | Karbowski | 324/327 |

Primary Examiner—Gerard R. Strecker
Assistant Examiner—Walter E. Snow
Attorney, Agent, or Firm—C. H. Grace; M. L. Union

[57] ABSTRACT

A new and improved method and apparatus is disclosed for detecting a target location with respect to an inductive tank circuit. A sensing field such as an electromagnetic field is established having an amplitude which changes in value due to the presence of a target in the sensing field. A first energy level is provided to maintain the field at an amplitude. A second energy level is provided to achieve a value for the field within the predetermined amount of time after initiation of the field.

15 Claims, 5 Drawing Figures

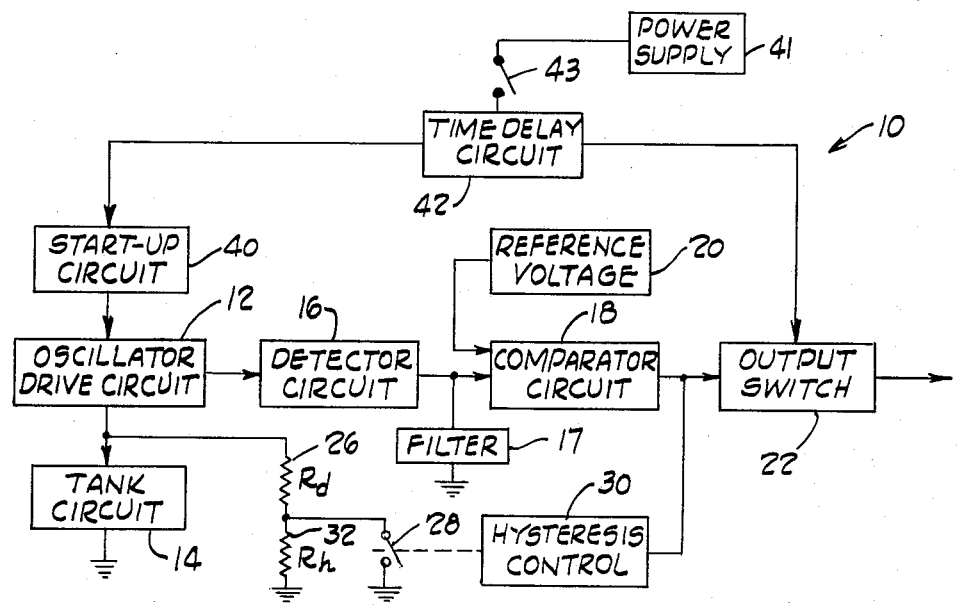
Fig. 1
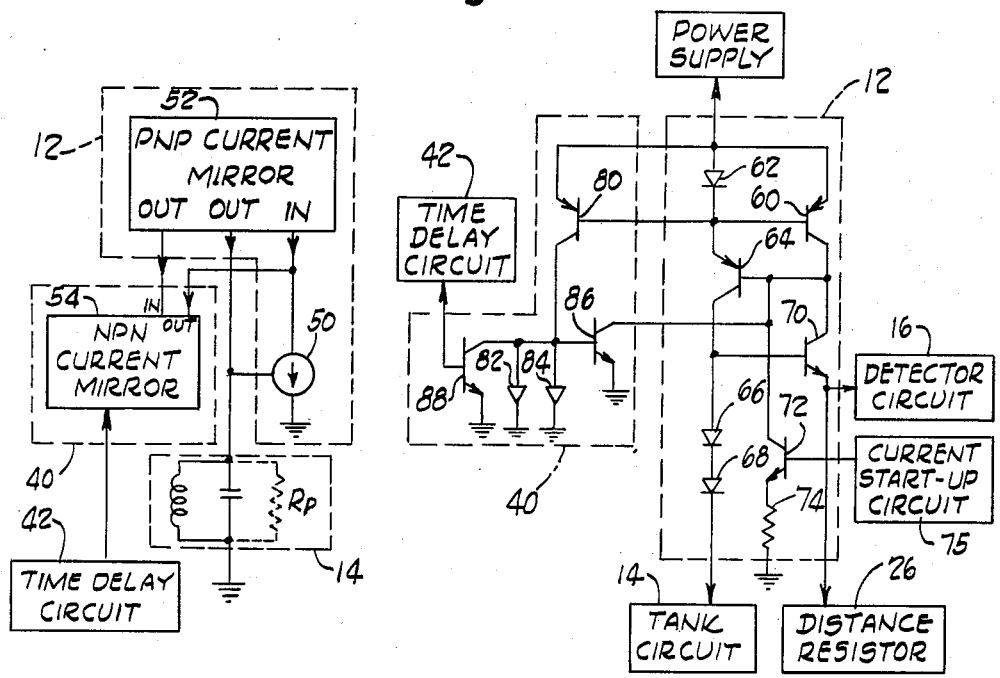
Fig. 2
Fig. 3

PROXIMITY SWITCH EXHIBITING IMPROVED START-UP CHARACTERISTICS

TECHNICAL FIELD

The present invention relates to a method and apparatus for detecting target locations and is particulary directed to a proximity switch and a method for operating a proximity switch of the type that utilizes an oscillator drive circuit in combination with an induction tank circuit to generate a target sensing field.

BACKGROUND ART

Proximity switches are known in the art. Such known proximity switches utilize an oscillator drive circuit in combination with an induction tank circuit. The tank circuit includes an induction coil as a means for sensing the presence of an object such as metal. The induction coil is constructed such that it generates a magnetic field in an area surrounding the coil. The magnetic field induces eddy currents in a conductive object which comes within the generated magnetic field. Such objects are known in the art as targets. Once a target comes within the magnetic field of the coil, energy is drawn from the induction coil. A typical induction proximity switch selects components of the oscillator and tank circuit to insure that oscillations occur when a target is absent from the magnetic field of the induction coil. When a target comes within the magnetic field of the induction coil, the oscillation amplitude is attenuated due to the loss of energy caused by the induction coil magnetic field inducing eddy currents in the target. The amount of the oscillation attenuation is directly related to the distance between the target and the induction coil.

A predetermined distance between the induction coil and the target is selected as the point where the output of the proximity switch changes an electrical state to indicate the presence of a target. This distance is known as the switch trip-point. A circuit within the proximity switch monitors the oscillation amplitude and generates a signal at the output of the proximity switch indicative of the fact that the target has come within the trip point distance.

One problem with prior art proximity switches occurs when power is first applied to the proximity switch or power is switched from a power-off to a power-on condition. If a target is located within the magnetic field of the induction coil but beyond the trip-point distance during this power-up condition, a false indication of target presense occurs. When power is applied to the proximity switch and the target is within the field, the oscillations of the tank circuit build up slowly due to the additional dampening of the induction coil caused by an energy transfer between the coil and the target. Thus, the oscillation amplitude will not reach a proper level within a given amount of time and a false indication that a target is within the trip-point distance occurs for the period of time required for the oscillator amplitude to reach this proper level.

One solution to this problem has been to provide a time delay circuit to disable the proximity switch output signal until after a certain amount of time has lapsed from an initial power-on condition. This solution has not proved satisfactory since the amount of time delay needed to insure that a false signal will not occur adversely affects the activation time of a switch after a power-up condition occurs.

Another problem with prior art proximity switches lies in the design of the detector circuit that is used to monitor the amplitude of the oscillations. The detector usually draws an amount of current from the oscillator circuit which changes as the target position changes. Consequently, hysteresis in the level of oscillation will be introduced or modified by the presence of the detector circuit. The magnitude of the hysteresis depends upon component parameters of the detector circuit which are subject to great variance.

Still another problem with prior art proximity switches lies in the design of the comparator circuit that is used to determine when the target has come within the trip point distance. The comparator circuit compares a D.C. output signal from the detector circuit against a reference voltage. The level of the D.C. voltage from the detector circuit is a function of the target distance from the induction coil. Noise or ripple on the detector output signal of the detector circuit can cause the comparator to chatter and result in a false target present output signal to occur at the output of the proximity switch.

DISCLOSURE OF THE INVENTION

The present invention provides a new and improved proximity switch and a method for operating a proximity switch of the type that utilizes an induction tank circuit driven by an oscillator drive circuit. The new method and apparatus in accordance with the present invention is designed to eliminate false target indications when power is applied to a proximity switch and a target is located within the magnetic field of an induction coil but beyond a trip point distance. The new apparatus is also designed to eliminate problems in a detector circuit and a comparator circuit within the proximity switch that has heretofore caused poor repeatability of trip-point distances and release-point distances from unit to unit and from changes in operating temperatures.

The proximity detection circuit of the present invention comprises a sensing means for establishing a sensing field which has a value, the presence of a target changing the value. A detecting means is provided for detecting changes in the value of the field. A drive means provides a first energy level to maintain the field and a second energy level to achieve a value for the field within a predetermined time after initiation of the field.

A method of the present invention for sensing a target location comprises the steps of establishing a sensing field which has a value, the presence of a target causing the value to change. The next step is detecting changes in the value of the sensing field. The establishing of the sensing field includes the steps of providing a first energy level to maintain the field and a second energy level to achieve a value for the field within a predetermined time after initiation of the field.

In the preferred embodiment, the proximity circuit utilizes a tank circuit having an induction coil to establish an electro-magnetic sensing field. An oscillator drive circuit having a PNP current mirror having a gain is operatively coupled to the tank circuit and a power supply to maintain the sensing field. The oscillator drive circuit causes the tank circuit to resonate with an amplitude having a value. A start-up circuit having a NPN current mirror is operatively coupled to the PNP current mirror of the oscillator drive circuit. The NPN current mirror, when enabled, increases the gain of the PNP current mirror by approximately a factor of two. An enable means is operatively coupled to the NPN current mirror of the start-up circuit for controlling the enabling or disabling of the NPN current mirror. When the NPN current mirror is enabled, it increases the gain of the PNP current mirror to establish a sensing field of proper value rapidly after initiation of the field. When the NPN current mirror is disabled, the PNP current mirror returns to its original gain and maintains the sensing field.

The present invention further provides a detector circuit which includes a differential comparator operatively coupled to the oscillator circuit and a reference voltage. A means for current compensation is operatively connected to the detector to null electrical effects the detector circuit has on the oscillator drive circuit and the tank circuit. These electrical effects are caused by current drawn by the detector circuit. The detector circuit detects and monitors the amplitude of the oscillations of the oscillator drive circuit and the tank circuit and generates a signal indicative of the distance between the target and the tank circuit. The amplitude of the oscillations varies as a function of the target distance.

A comparator circuit is provided and is operatively connected to a reference voltage and the output of the detector circuit for comparing the level of the output signal from the detector circuit to a reference voltage. The comparator circuit generates a signal indicative of the target location with respect to a predetermined distance from the tank circuit. The predetermined distance at which the comparator circuit generates such a signal is known as the trip-point distance. An internal hysteresis circuit is provided in the comparator circuit to eliminate comparator chatter caused by ripple or noise on the output signal of the detector circuit.

A timing circuit is provided and is operatively connected to the enable means of the NPN current mirror of the start-up circuit. The timing circuit enables the start-up circuit for a predetermined amount of time when power to the proximity circuit is switched from a power-off to a power-on condition. The start-up circuit allows additional energy be applied to the oscillator circuit for the purpose of rapidly increasing the oscillation amplitude to a value during a power-on condition. The start-up circuit thus eliminates false target indications from occuring when a target is within the magnetic field of the induction coil but not within the trip-point distance of the tank circuit.

The present invention further provides an output switch operatively coupled to the comparator circuit output. The output switch generates an output drive signal to a load which is indicative of the comparator signal. The output switch has an enable operatively coupled to the timing circuit, the timing circuit disables the output switch for a predetermined amount of time during a power-on condition.

The present invention further provides a hysteresis control circuit operatively connected to the comparator circuit and the oscillator drive circuit to add hysteresis to the proximity switch. This hysteresis control circuit effectively increases the trip-point distance after a target has come within the initial trip-point distance and has tripped the proximity switch. This increased trip-point distance is also referred to as the release-point distance since it is this distance that the target must move beyond to release the comparator circuit. The hysteresis control circuit allows the increased trip-point distance to return to the initial trip-point distance when the target moves back beyond the increased trip-point distance or the release-point distance.

BRIEF DESCRIPTION OF THE DRAWINGS

FIG. 1 is a block diagram of a circuit made in accordance with the present invention.

FIG. 2 is a block diagram of a portion of the circuit shown in FIG. 1.

FIG. 3 is a schematical representation of part of the circuit shown in FIG. 1 including the start-up circuit and the oscillator drive circuit.

BEST MODE FOR CARRYING OUT THE INVENTION

Figure 4:
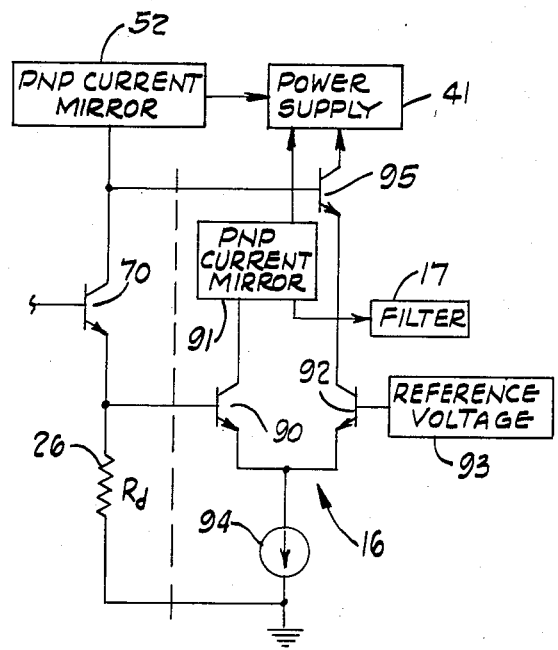
FIG. 4 is a schematical representation of a portion of the circuit shown in FIG. 1 including the oscillator drive circuit and the detector circuit.

Referring now to the drawings and more particularly to FIG. 1, a proximity switch 10 includes an oscillator drive circuit 12 operatively coupled to a tank circuit 14. The tank circuit 14 is of the type typically used in proximity switches which includes an induction coil and a capacitor connected in parallel. The tank circuit is operatively coupled between the oscillator drive circuit 12 and ground.

Although the oscillator drive circuit 12 is referred to as an oscillator, those skilled in the art will recognize that the oscillator is a resonator drive circuit which when in combination with the tank circuit causes oscillation to occur between the oscillator drive circuit and the tank circuit. The generated signal is a sinusoidal wave having an amplitude value.

When a metal object, known in the art as a target, comes within the magnetic field established by the induction coil, eddy currents occur in the target. The induced eddy currents in the target causes an energy loss in the induction coil. The loss of energy causes the oscillation amplitude of the tank circuit to be dampened or attenuated.

A detector circuit 16 is operatively coupled to the oscillator drive circuit 12 and the tank circuit 14 and detects and monitors the oscillation amplitude of the oscillator drive circuit and the tank circuit. The detection circuit generates a signal indicative of the oscillation amplitude. A filter 17 is operatively connected between the detector circuit and ground for filtering the detector circuit output signal into a D.C. signal. A comparator circuit 18 compares the filtered signal from the detector circuit 16 against a reference voltage 20. The distance between the target and the tank circuit which causes the value of the filtered detector output signal to equal the reference voltage 20 is known as the trip-point distance. Once the target comes within the trip-point distance of the tank circuit, the level of the filtered signal from the detector falls below the level of the reference voltage 20. The comparator circuit 18 then generates a signal to an output switch 22 which indicates that the target has come within the trip-point distance. The output switch 22 then changes an electrical state commensurate with the output signal from the comparator.

The trip-point distance between the target and the tank circuit can be varied by use of a distance resistor 26 operatively coupled between the oscillator drive circuit and ground through a switch 28. The distance resistor establishes an initial loading condition on the oscillator drive circuit and the tank circuit when the switch 28 is closed. The trip-point distance at which the proximity switch indicates a target increases as the value of the distance resistor increases. The trip-point distance decreases as the value of the distance resistor decreases.

A hysteresis control circuit 30 is operatively coupled to the comparator circuit 18 and to the switch 28. A hysteresis resistor 32 is operatively coupled in series between the distance resistor 26 and ground and in parallel across switch 28. When a target has come within an initial trip-point distance established by the distance resistor 26 connected to ground through switch 28, the hysteresis control circuit opens the switch 28 effectively connecting the distance resistor 26 and the hysteresis resistor 32 in series to ground. The new distance resistance seen by the tank circuit and the oscillator drive circuit is increased and a new trip-point distance occurs which is greater than the initial trip-point distance established by distance resistor 26 alone. The new increased trip-point distance is also referred to as the release-point distance. When the target moves away from the induction coil, it must move beyond the new increased trip-point distance before the output switch will indicate that the target is no longer present. After the target moves beyond the increased trip-point distance established by the series combination of resistors 26, 32, switch 28 closes and the trip-point distance returns the original trip-point distance established by resistor 26 alone. As those skilled in the art will appreciate, the amount of hysteresis of the proximity switch 10 is controlled by the hysteresis resistor 32.

A problem with the proximity switch thus described occurs when power to the switch is switched from a power-off to a power-on condition. If a target is located within the magnetic field of the induction coil but beyond the trip-point distance, a false target present signal occurs when power is switched on to the proximity switch 10. The false signal occurs because energy coupling between the induction coil and the target causes the value of the oscillation amplitude to build up slower than would occur if the target was not in the field. Disabling the output switch 22 for a period of time necessary to insure that the oscillation amplitude has achieved a proper level is not a satisfactory solution since the activation time of the proximity switch after a power-off to a power-on condition occurs would be increased.

In order to eliminate this false signal problem during a power-up condition, the present invention provides a start-up circuit 40 operatively coupled to the oscillator drive circuit 12 and a power supply 41 for the proximity switch 10. The start-up circuit 40 increases the gain of the oscillator drive circuit 12 for a predetermined time period after power is applied to the proximity switch 10. The amplitude of the oscillations of the oscillator drive circuit and the tank circuit build up to a proper level rapidly after the power-up condition occurs. A first energy level is thus provided to maintain the field and a second energy level is provided to achieve a value for the field rapidly after initiation of the field.

A switch 43 is shown in FIG. 1 between the power supply 41 and the remainder of the proximity switch 10. Although it is contemplated that the switch 43 can be used to connect and disconnect power to the proximity switch 10, those skilled in the art will appreciate that there are many ways of switching to power on and off to the proximity switch 10. Also, once switch 43 is closed, it is to be understood that power is applied to all of the circuits of the proximity switch 10.

A time delay circuit 42 is operatively coupled to the proximity switch power supply 41, the output switch 22 and the start-up circuit 40. The time delay circuit 42 enables the start-up circuit 40 for a predetermined amount of time after power to the proximity switch 10 has changed from a power-off to a power-on condition. The time delay circuit also disables the output switch 22 for approximately the same amount of time that the start-up circuit is enabled. Referring now to FIG. 2, the operation of the start up circuit will be appreciated. The oscillator drive circuit 12 comprises a voltage controlled current source 50 which is controlled by the voltage across the tank circuit 14. A PNP current mirror 52 feeds current back in a positive sense from the current source 50 to the tank circuit 14. The tank circuit 14 has a parallel impedance at resonance equal to $R_p$. The open loop gain $A_{ol}$ of the oscillator drive circuit is approximately equal to $R_p/R_d$ where $R_d$ is the impedance of the distance resistor 26 (see FIG. 1). Oscillations will occur between the oscillator drive circuit and the tank circuit when the open loop gain is greater than or equal to 1. The start-up circuit 40 includes an NPN current mirror 54 which is operatively connected to the PNP current mirror 52 and the power supply 41 for the proximity switch 10. The NPN current mirror 54 feeds current back in the positive sense to the input of the PNP current mirror. The NPN current mirror is preferably a 2 to 1 ratio current mirror which effectively doubles the oscillator drive circuit open loop gain.

As those skilled in the art will appreciate, the distance between the induction coil and the target will be a factor in the value of $R_p$. As the target approaches the induction coil, the value of $R_p$ decreases. The target trip-point distance preferably occurs when $R_p$ approximately equals $R_d$ although any distance prior to causing $R_p$ to equal $R_d$ can be choosen. If $R_p$ is less than $R_d$, the oscillations between the oscillator drive circuit and the tank circuit stops.

Without the start-up circuit connected with the oscillator drive circuit and the tank circuit, the time constant of the envelope of the resultant oscillations can be expressed as $T_E=(2R_pC)/(\text{gain}-1)$ where $R_p$ is the tank circuit impedance at resonance, C is the tank circuit capacitor and the gain is $R_p/R_d$. With the startup circuit connected to the oscillator drive circuit and the tank circuit, the time constant of the envelope of the resultant oscillations when power-up occurs can be expressed as $T_E=(2R_pC)/(2\text{ gain}-1)$. Assuming that a proximity switch without the start-up circuit has a gain of 1.1, the addition of the start-up circuit would increase the gain to 2.2 and in effect reduce the time constant of the envelope of the oscillations by a factor of 10. As those skilled in the art will appreciate, the start-up circuit in this example would permit the proximity switch to be enabled 10 times faster than would be possible without the start-up circuit.

Referring now to FIG. 3, a specific embodiment of the start-up circuit and oscillator drive circuit made in accordance with the present invention is shown. The oscillator drive circuit 12 utilizes a transistor 60, a diode 62 and a transistor 64 which, as those skilled in the art will appreciate, is operatively connected in a current mirror configuration. Diodes 66, 68 are operatively connected between the collector of transistor 64 and the tank circuit 14. The collector of transistor 64 is also operatively connected to the base of transistor 70. Current from the collector of transistor 64 establishes a bias of two diode potentials at the base of the transistor 70. One of these diode potentials is equilized by the base to emitter voltage of transistor 70. The remaining diode potential appears across the distance resistor 26 that is connected to the emitter of transistor 70. The diode potential across the distance resistor sets up a current through transistor 70 and the rest of the oscillator drive circuit. In the configuration thus described, the current from the collector of transistor 70 is acurately reproduced by transistor 64 and is supplied with a high output impedance to tank circuit 14 through the diodes 66, 68. This is a positive feedback connection with a open loop gain of approximately $R_p/R_d$. $R_p$ is the parallel resistance of the tank circuit at resonance while $R_d$ is the value of a distance resistor. The circuit will oscillate whenever the open loop gain is greater than unity.

A transistor 72 and a resistor 74 is operatively connected between the base of transistor 64 and ground to establish a small bias current to the current mirror. A current start-up circuit 75 is connected to the base of transistor 72. The small bias current starts current flowing through the oscillator drive circuit and establishes an initial bias across diodes 66, 68. The magnitude of this bias current is selected to provide the best linearity in the open loop gain of the oscillator drive circuit.

As described above, when power is applied to the oscillator drive circuit, the start-up circuit aids in building up the oscillation amplitude of the oscillator drive circuit and the tank circuit as rapidly as possible. The start-up circuit includes a PNP transistor 80 in conjunction with diodes 82, 84 and transistor 86, which as those skilled in the art will appreciate, are connected in an NPN current mirror configuration. The NPN current mirror 54 provides positive feedback preferably with an open loop gain of one half to the PNP current mirror of the oscillator drive circuit. This positive feedback doubles the gain of the PNP current mirror 52 when the start-up circuit 40 is enabled. The increased gain of the oscillator drive circuit reduces the time constant of the envelope of the oscillations.

A transistor 88 is operatively connected to the base of transistor 86, to ground, and to the time delay circuit 42. The transistor 88 is used to clamp the base of transistor 86 in order to disable the start-up circuit 40 after a predetermined amount of time has elapsed. Thus, the start-up circuit causes additional energy to be provided to the oscillator drive circuit when power is turned on to the proximity switch. This increased power causes the oscillation amplitude to build up to a proper level rapidly. If a target happens to be within the trip-point distance when power-up occurs, the start-up circuit will not hamper immediate detection of the target presence since the start-up circuit is disabled when the output switch is enabled.

Refering now to FIG. 4, the detector circuit 16 in accordance with the present invention detects and monitors the amplitude of the oscillations of the oscillator drive circuit and the tank circuit. The detector circuit comprises a differential comparator including transistors 90, 92 which is operatively connected to the distance resistor $R_d$ and a reference voltage 93. The base of the transistor 90 is operatively connected to the emitter of the oscillator transistor 70. The base of the transistor 92 is operatively connected to a reference voltage 93. The emitters of transistors 90, 92 are operatively connected to a current source 94. The transistors 90, 92 are operatively connected in a differential comparator configuration. When the oscillation amplitude at the base of transistor 90 exceeds the reference voltage on the base of transistor 92, the transistor 90 will conduct. The collector of transistor 90 is operatively connected to a PNP current mirror 91 which in turn connected to a filter 17 that converts or filters current pulses which are reflected in the PNP current mirror 91 into a DC signal.

The loading of the transistors 90, 92 across the distance resistor is a non-linear impedance which has an electrical effect on the operation of the oscillator drive circuit. This effect gives rise to a poorly controlled hysteresis characteristic between the start up of the oscillator and the dampening of the oscillations caused by target movements within the electro-magnetic field of the induction coil. The conduction of transistor 90 causes the current drawn by the transistor base to produce the same effect as if the distance resistor were slightly reduced in value i.e. the open loop gain of the oscillator is increased. In order to compensate for this effect, a transistor 95 is provided as a means for current compensation. The base of transistor 95 is operatively connected to the collector of transistor 70. The emitter of transistor 95 is operatively connected to the collector of transistor 92. The collector of transistor 95 is operatively connected to the power supply 41 for the proximity switch 10. The base current of transistor 95 varies differentially with that of transistor 90 i.e. as the base current of transistor 90 increases, the base current of transistor 95 decreases by essentially the same amount. Consequently, the net change in current in the oscillator circuit is zero and the open loop gain is unaffected as the comparator threshold of the detector circuit is exceeded.

Figure 5:
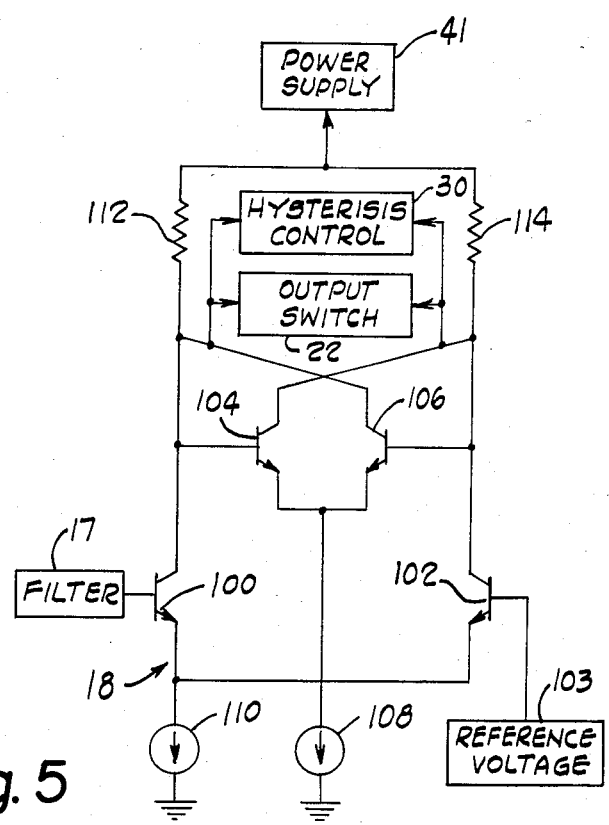
FIG. 5 is a schematical representation of a portion of the comparator circuit shown in FIG. 1.

Referring now to FIG. 5, the operation of the comparator circuit 18 in accordance with the present invention will be appreciated. The filtered detector signal from the filter 17 is operatively coupled to the base of a transistor 100 of the comparator 18. A transistor 102 is operatively coupled with transistor 100 in a differential comparator configuration. The base of transistor 102 is operatively coupled to a reference voltage 103. This differential comparator configuration compares the filtered output signal from the detector 16 to the reference voltage 103 at the base of transistor 102. Transistors 104, 106 in combination with a current source 108 provide hysteresis to the comparator circuit 18 to prevent chattering due to ripple or noise present on the filtered detector output signal. Transistors 104, 106 provide positive feedback to each other so that on either side of the trip-point distance or switching threshold the switching is regenerative and a snap-action results. The collectors of transistors 104, 106 are operatively coupled to the hysteresis control 30 and the output switch 22.

The hysteresis is reflected in the bases of transistor 100, 102 through the current ratio established by the current sources 108, 110. The current source 110 is selected so that the comparator circuit carries twice as much current as the hysteresis transistors 104, 106. Thus when the current in transistors 100, 102 is balanced, the current through resistors 112, 114 is still unbalanced by 50%. To overcome this unbalance and to cause transistors 104, 106 to switch, the current in transistors 100, 102 must be unbalanced in the opposite direction. With this current unbalance in transistors 100, 102, the difference in emitter current density will translate into a base voltage differential according to the well known exponential relationship between voltage and current for a semi-conductor junction. This offset voltage is the hysteresis of a comparator viewed at the base of transistor 100. Because the difference in emitter current density is controlled by the current sources 108 and 110, the hysteresis is very predictable. Thus, hysteresis is achieved in a form which does not require large resistors and is uniquely suited to the fabrication of the comparator circuit in an integrated circuit.

From the foregoing, it should be apparent that a new and improved method and apparatus for detecting target location has been provided. The new and improved method includes establishing a sensing field having a value, the presense of a target changing the value, detecting changes in the value and wherein establishing the field includes providing a first energy level to maintain the field, and providing a second energy level to acheive a value for the field within a predetermined time after initiation of the field. The new and improved apparatus includes a sensing means for establishing a sensing field having a value, the presence of a target changing the value, detecting means for detecting changes in the value and drive means for providing a first energy level to maintain the field and a second energy level to achieve a value for said field within a predetermined time after initiation of said field.

We claim:

1. A proximity circuit for sensing a target location comprising a sensing circuit for establishing a sensing field having a predetermined value, the presence of said target changing said value, detecting means for detecting changes in said value, a drive circuit for energizing said sensing circuit to a first energy level to maintain said field, a start-up circuit coupled to the drive circuit to increase energization of said sensing circuit by said drive circuit to a second energy level, and a time delay circuit coupled to said start-up circuit to activate the start-up circuit for a predetermined time after energization of the proximity circuit, said delay circuit also coupled to the detecting means to deactivate the detecting means for approximately the same predetermined time.

2. A proximity circuit for sensing a target location comprising means for establishing an electro-magnetic sensing field having an amplitude, the presence of said target in said field changing said amplitude, a detecting circuit for detecting changes in said amplitude, a drive circuit operatively coupled to said means for establishing for providing a first energy level to maintain said sensing field, a start-up circuit operatively coupled to said drive circuit for providing a second energy level to said means for establishing to achieve a predetermined field amplitude rapidly after energization of the proximity circuit, and a timing circuit coupled to both the start-up circuit and the detecting circuit to activate the start-up circuit for a predetermined time and deactivate the detecting circuit for approximately the same predetermined time.

3. A proximity switch for indicating a target location comprising an induction coil, first drive means operatively coupled to said induction coil for maintaining an oscillating electro-magnetic field having an amplitude about said induction coil, the presence of said target in said field changing said amplitude, sensing means responsive to said electromagnetic field operatively coupled to said field for generating a signal indicative of when said target has come within a predetermined distance of said induction coil, second drive means operatively coupled to said first drive means for causing additional energy to pass to said induction coil after initiation of said field, and a timing circuit connected to the second drive means to maintain the additional energy level for a predetermined time while disabling the sensing means for approximately the same predetermined time.

4. A proximity circuit for indicating target location comprising a tank circuit, an oscillator drive circuit operatively coupled to said tank circuit for driving said tank circuit into oscillation having an amplitude, the amplitude level being a function of the distance between the target and the tank circuit, sensing means responsive to said oscillation amplitude for generating a signal indicative of a predetermined distance between said target and said tank circuit, a comparator circuit coupled to said sensing means for generating a signal indicative of said target coming within a predetermined distance of said tank circuit, and wherein said comparator circuit includes a hysteresis circuit for preventing said comparator circuit from switching from a target present signal to a target absent signal due to noise present on said signal from said sensing means, and start-up circuit means operatively coupled to said oscillator drive circuit for causing additional drive power to occur in said oscillator drive circuit when power to said oscillator drive circuit switches from a power-off to a power-on condition.

5. The proximity circuit of claim 4 wherein said comparator circuit includes a differential comparator operatively coupled to said signal from said means responsive to said oscillation amplitude and a reference voltage and wherein said hysteresis circuit includes a cross-coupled, bistable latch operatively coupled to said differential comparator, said latch adjusting the voltage differential in the differential comparator for adding sufficient hysteresis to said comparator circuit to prevent switching due to electrical noise or ripple present on the output signal from said means responsive to said oscillation amplitude.

6. The proximity switch of claim 5 wherein said differential comparator is operatively coupled to two current sources and the magnitude of hysteresis from said hysteresis circuit is controlled by the ratio of the current from said current sources.

7. A proximity switch for detecting when a target is within a predetermined distance of a tank circuit, said proximity switch comprising a resonator drive circuit having a current drive source operatively coupled to a power supply and to said tank circuit and causing said tank circuit to resonate at an amplitude value, the presence of said target causing said amplitude to change, means responsive to changes in said amplitude value operatively coupled to said resonator drive circuit for generating a signal indicative of the target being within said predetermined distance of said tank circuit, start-up circuit means operatively coupled to said resonator drive circuit for causing additional current drive to occur in said resonator drive circuit when power to resonator drive circuit is switched from a power-off to a power-on condition and a timing circuit operatively coupled to said start-up circuit means, said timing circuit disabling said start-up circuit means after a predetermined amount of time has elapsed after power is applied to the proximity switch.

8. The proximity circuit of claim 7 wherein said current drive source of said resonator drive control is a PNP current mirror.

9. The proximity circuit of claim 8 wherein said start-up circuit means is an NPN current mirror operatively coupled to said PNP current mirror.

10. The proximity circuit of claim 9 wherein said NPN current mirror effectively doubles the output gain of said PNP current mirror.

11. A proximity switch for detecting when a target is within a predetermined distance of a tank circuit, said proximity circuit comprising a resonator drive circuit having a PNP current mirror operatively coupled to said tank circuit, said tank circuit resonating when said target is beyond said predetermined distance, a start-up circuit having an NPN current mirror operatively coupled to said PNP current mirror, said NPN current mirror approximately doubling the gain of said PNP current mirror, enable means operatively coupled to said NPN current mirror for controlling when said NPN current mirror is enabled, detector circuit including a differential comparator operatively connected to said resonant circuit and a reference source, said detector circuit detecting and generating a signal indicating a target presence, and a comparator circuit operatively connected to a reference voltage and said detector circuit for comparing the signal indicative of target presence from said detector circuit against said reference voltage and generating a signal indicative of the target being within said predetermined distance.

12. The proximity circuit of claim 11 further including an output switch having an enable input operatively coupled to a comparator output for generating a drive signal indicative of the generated comparator signal.

13. The proximity circuit of claim 12 further including a timing circuit operatively coupled to said enable input means of said NPN current mirror and said enable of said output switch to disable said output switch and enable said NPN current mirror for a predetermined amount of time when power to said proximity circuit is switch from a power-off to a power-on condition.

14. The proximity circuit of claim 11 further including a hysteresis control circuit operatively connected to said comparator and said resonant drive circuit to add hysteresis to the proximity circuit, effectively increasing said predetermined distance once said target has come within said predetermined distance.

15. The proximity circuit of claim 14 wherein said hysteresis control circuit causes said increased predetermined distance to return to the initial predetermined amount of distance when said target exceeds said increased predetermined amount of distance.

* * * * *